United States Patent [19]
Tomcufcik et al.

[11] 3,711,613
[45] Jan. 16, 1973

[54] COMPOSITIONS CONTAINING 3-NITROIMIDAZO(1,2-B)PYRIDAZINES AND METHOD OF USE FOR TREATING AMOEBAE AND TRICHOMONAE

[75] Inventors: Andrew Stephen Tomcufcik, Old Tappan; Raymond George Wilkinson, Montuale, both of N.J.

[73] Assignee: American Cyanamid Company, Stamford, Conn.

[22] Filed: Feb. 24, 1971

[21] Appl. No.: 118,509

[52] U.S. Cl. .............................. 424/250
[51] Int. Cl. .............................. A61k 27/00
[58] Field of Search ..................... 424/250

[56] References Cited

OTHER PUBLICATIONS

Kobe et al. – Tetrahedron – Vol. 24, Jan. 1968, pages 239 & 242.

*Primary Examiner*—Sam Rosen
*Attorney*—Ernest Y. Miller

[57] ABSTRACT

Compositions of a pharmaceutically acceptable carrier and a 3-nitroimidazo[1,2-b]pyridazine and methods of using the same are described. These compositions are useful for their anti-protozoal activity as anti-trichomonal and anti-amebic agents.

6 Claims, No Drawings

COMPOSITIONS CONTAINING 3-NITROIMIDAZO(1,2-B)PYRIDAZINES AND METHOD OF USE FOR TREATING AMOEBAE AND TRICHOMONAE

SUMMARY OF THE INVENTION

This invention relates to compositions containing 3-nitroimidazo[1,2-b]pyridazines and methods of using the same.

Compositions of this invention have, as the active component, compounds illustrated by the following formula:

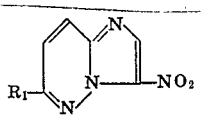

wherein $R_1$ is selected from the group consisting of hydrogen and lower alkyl.

In the above compounds lower alkyl is intended to include those having one to four carbon atoms.

The present compounds can be prepared by the following method. The reaction of an imidazo[1,2-b]pyridazine with nitric and sulfuric acid which can be illustrated as follows:

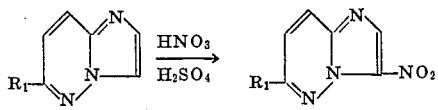

wherein $R_1$ is as hereinbefore described. The reaction can be carried out at room temperature. It is preferable to use about 70 percent nitric acid with about 96 percent sulfuric acid. When the reaction is carried out above room temperature then lower concentrations of acids are suitable.

The present compounds as active components are useful for their anti-protozoal activity as anti-trichomonal and anti-amebic agents in warm-blooded animals. They may be used in dosages in the range of from about 0.5 mg. to 30 mg. per kilogram of warm-blooded animal. They can be formulated and used in well known pharmaceutical forms such as pills, capsules, tablets, liquids, liquid filled capsules and the like. The various excipients, fillers, flavoring agents, etc. used in preparing the pharmaceutical forms are well known to those skilled in the art.

The amebicidal properties of the present compounds are measured by means of an assay devised from W. R. Jones, "The Experimental Infection of Rats With *Entamoeba histolytica* and a method for Evaluating the Anti-Amoebic Properties of New Compounds," *Annals of Tropical Medicine and Parasitology*, volume 40, pages 130–140 (1946). The assay is carried out as follows:

The test organism is *Entamoeba histolytic* NIH 200 μ. Cultures are maintained on Cleveland Collier liver infusion medium with serum saline 1:1 overlay in 3 × 5 test tube slants. Rice powder is added as a growth factor. Cultures are transferred at 5 day intervals and kept at 37° C. A 48 hour culture is used for the test inoculum and harvested the morning of the test by collecting the sediment containing rice powder and amoebae found at the junction of the butt and the slant. The amoebae are counted and the amount of inoculum for injection is adjusted to contain approximately 200,000 to 250,000 amoebae. Female Wistar strain albino rats from the Royalhart Farms weighing 20–35 grams are used. The cecum is exposed during laporatomy and the amoebae-rich inoculum is injected into the anterior section. The incision is closed with autoclips. Procedures are sterile throughout the course of the surgery. The infected rats are divided randomly into groups of 10. Treatment is begun on the day of infection. Drugs are premixed in a standard laboratory feed such as Purina Lab. Chow sold by the Ralston Purina Company. Rats are maintained on the drug diet for 5 days at the end of which they are necropsied and the cecum examined both macroscopically for pathologic feature of infection and microscopically for the presence of amoebae. Scores of one each are recorded for evidences of mucous, fibrosus, and lesions or inflammation. A score of one is recorded for a finding of 1–20 amoeba and a score of two for a finding of more than 20 amoeba on a standard slide preparation. Total score of zero to five, thus, is possible per rat at necropsy. The The arithmetic mean of the combined A.D.I.'s (average degree of infection) in a test or control group of rats is considered to be the group ADI. Activities are expressed in percentage of suppression of group ADI of a test group to the group ADI or a control group. Consumption of test compound is determined from the weight of feed consumed. The present compound 3-nitroimidazo-[1,2-b]pyridazine has a minimum effective dose (60 percent supp. of control A.D.I.) mg./kg./day × 5 of 30.

The present compounds have shown activity as trichomonicides in tests designed to detect this activity. One such test is carried out as follows:

Female albino mice (Royalhart ICR strain) are inoculated subcutaneously with 50,000 to 100,000 *Trichomonas vaginalis* (Thoms strain) suspended in a cysteine-peptone-liver infusion-maltose medium described by Garth Johnson and Ray E. Trussell, "Experimental Basis for the Chemotherapy of *Trichomonas vaginalis* Infections I.," *Proceedings of the Society for Experimental Biology and Medicine* Volume 54, pages 245–249 (1943). In control animals, approximately one week postinoculation, the site of inoculation is marked by a subcutaneous abcess which contains numerous trichomonads in a menstruum of pus. In effectively treated animals the abcesses are either undetectable or greatly reduced in size, the motile trichomonads cannot be detected in the lesion-derived material after prolonged microscopic examination. Presence of a single motile trichomonad after treatment is recorded as a negative result.

Treatment by test drugs consists either of one or more oral doses suspended in 0.2 percent agar and administered by gavage one day post inoculation, or by administration in the diet for 5 consecutive days beginning one day postinoculation. The diet is a commercial laboratory feed sold under the trademark Purina Lab. Chow by the Ralston-Purina Company. The test compound is mixed thoroughly in the carrier; 0.2 percent agar, 0.5 percent carboxymethylcellulose or ground laboratory feed. Each regimen is administered to a test group consisting of five or ten mice. Control groups of five or ten mice receive the carrier alone. Gavage doses are estimated for the average mouse weight obtained just before dosing. Drug intakes resulting from diet therapy are estimated from average mouse weights and total group feed intakes during the treatment period. Activities in this test compare to that of 2-methyl-5-nitro-1-imidazolethanol, a well recognized trichomonicide. The following Table I shows the activity of the present compounds.

TABLE I

The activity of the present compounds against subcutaneous *Trichomonas vaginalis* infections in mice

| Compounds | No. cleared[a]/No. treated after single gavage dose, mg./kg. | | | | |
|---|---|---|---|---|---|
| | 100 | 50 | 2.5 | 12.5 | 6.2 |
| 3-nitroimidazo-[1,2-b]pyridazine | — | 10/10 | 10/10 | 10/10 | 10/10 |
| 6-methyl-3-nitro-imidazo[1,2-b]-pyridazine | 10/10 | — | — | — | — |

[a] Number of mice in which no motile trichomonads were detected microscopically, at autopsy 5 days post treatment.

Compositions containing as the active component the 3-nitroimidazo[1,2-b]pyridazines may be administered to warm-blooded animals orally, or parenterally if desired, and when so administered, may be considered as an agent for the therapeutically desirable treatment of protozoal infections such as amebic or trichomonal infections in daily doses ranging from about 0.5 mg. to about 30 mg. per kilogram. The dosage regimen can be adjusted to provide optimum therapeutic response. Thus, for example, several smaller doses may be administered daily, or the dose may be reduced or increased proportionately as indicated by the requirements or the particular therapeutic situation.

For therapeutic administration the active components of this invention may be incorporated with pharmaceutically acceptable carriers such as excipients and used, for example, in the form of tablets, dragees, capsules, suppositories, liquids, elixirs, emulsions, suspensions or the like. Such comparisions and preparations should contain at least 0.1 percent active component. The percentage in the compositions and preparations, may of course, be varied, and may conveniently be between 2 and 60 percent or more of the weight of the unit. The amount of compound in such therapeutically useful compositions or preparations is such that a suitable dosage will be obtained. Preferred compositions or preparations according to the present invention are prepared so that a dosage unit form contains between about 10 and about 300 milligrams of the active compound. Obviously, in addition to the therapeutic compound, there may be present excipients, binders, fillers and other therapeutically inert ingredients necessary in the formulation of the desired pharmaceutical preparation.

SPECIFIC DESCRIPTION

The following examples describe in detail the preparation of representative compounds of this invention and formulations containing these compounds.

EXAMPLE 1

Preparation of 3-Nitroimidazo[1,2-b]pyridazine

To imidazo[1,2-b]pyridazine (Kobe et al. *Tetrahedron* 24, 239 (1968) is added with stirring concentrated sulfuric acid and the mixture cooled to about 10° C. Stirring is continued and during 5 minutes nitric acid is added dropwise. The reaction mixture is stirred at room temperature for 20 minutes and poured onto crushed ice. The separated product is recrystallized from water and pale yellow needles are obtained, melting point 199°–201° C.

EXAMPLE 2

Preparation of 6-Methyl-3-nitroimidazo[1,2-b]pyridazine

Five and five-tenths grams of 6-methylimidazo[1,2-b]-pyridizine is added to 18 ml. of concentrated sulfuric acid. The solution is stirred vigorously as 4.8 grams of solid potassium nitrate is added in small portions. When addition is complete, the reaction is heated at 90° C. for 40 minutes. It is then drowned into ice and water. After near neutralization with concentrated ammonium hydroxide, the mixture is extracted with chloroform. The chloroform is removed under reduced pressure, leaving a yellow crystalline residue. This is purified by recrystallization from a mixture of chloroform and ethanol, yielding 5.2 grams of pure compound, melting at 203°–204° C.

Analysis: Calcd. for $C_7H_6N_4O_2$: C, 47.19; H, 3.40; N, 31.45.
Found: C, 47.11; H, 3.50; N, 31.48.

EXAMPLE 3

Suppositories containing 3-nitroimidazo[1,2-b]pyridazine

| | 30 suppositories g. |
|---|---|
| 3-nitromidazo[1,2-b]pyridazine | 7.5 |
| Purified water qs AD | 20 |
| Gelatin granular | 40 |
| Glycerin | 140 |

Add the water to the medicinal substance to make 20 g. and dissolve or mix together. Add the glycerine and mix well. To the mixture add the gelatine carefully avoiding incorporation of air and heat on steam bath until gelatin is dissolved. Pour the melted mixture into 30 chilled molds and allow to congeal. Each suppository contains 250 mg. of therapeutic component.

EXAMPLE 4

Preparation of Hard Shell Capsules containing 3-nitroimidazo-[1,2-b]pyridazine

| | per 1,000 Capsules g. |
|---|---|
| 3-nitroimidazo[1,2-b]pyridazine | 200.0 |
| Lactose | 900.0 |
| Magnesium stearate | 10.0 |

The ingredients are blended together. The mixture is used to fill hard shell capsules of a suitable size each containing 200 mg. of active component.

EXAMPLE 5

Preparation of Tablet Compositions Containing 6-methyl-3-nitro-imidazo[1,2-b]pyridazine

| | per 1,000 Tablets g. |
|---|---|
| 6-methyl-3nitroimidazo[1,2-b]pyridazine | 100.0 |
| Corn starch USP | 300.0 |
| Dibasic calcium phosphate | 2150.0 |
| Magnesium stearate | 600.0 |

The above ingredients are thoroughly mixed and incorporated into a standard pharmaceutical tablet. Each tablet contains 100 mg. of therapeutic components.

We claim:

1. A method of inhibiting the growth of protozoa selected from the group consisting of amoebae and trichomonae in warm-blooded animals which comprises administering to said animals a composition of an anti-amoebae or anti-trichomonae amount of a nitroimidazo-pyridazine of the formula:

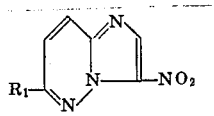

wherein $R_1$ is selected from the group consisting of hydrogen and lower alkyl and a pharmaceutically acceptable carrier.

2. The method in accordance with claim 1, wherein the nitroimidazopyridazine is 3-nitroimidazo[1,2-b]pyridazine.

3. The method in accordance with claim 1, wherein the nitroimidazopyridazine is 3-nitroimidazo[1,2-b]pyridazine and the protazoa is an amoebae.

4. The method in accordance with claim 1, wherein the nitroimidazopyridazine is 6-methyl-3-nitro-imidazo[1,2-b]pyridazine.

5. The method in accordance with claim 1, wherein the nitroimidazopyridazine is 6-methyl-3-nitro-imidazo[1,2-b]pyridazine and the protozoa is a trichomonae.

6. A therapeutic composition useful for the control of protozoa selected from the group consisting of amoebae and trichomonae in warm-blooded animals which comprises a pharmaceutically acceptable carrier and from 10 to 300 mg. of a nitroimidazopyridazine of the formula:

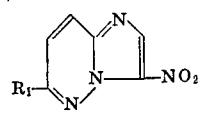

wherein $R_1$ is selected from the group consisting of hydrogen and lower alkyl.

* * * * *